United States Patent
Berger et al.

(10) Patent No.: US 6,874,381 B2
(45) Date of Patent: Apr. 5, 2005

(54) ACTUATING ARRANGEMENT FOR A GEARBOX AND METHOD OF OPERATING THE SAME

(75) Inventors: Reinhard Berger, Bühl (DE); Gunter Hirt, Seebach (DE)

(73) Assignee: LUK Lamellen und Kupplungsbau Beteiligungs KG, Bühl (DE)

( * ) Notice: Subject to any disclaimer, the term of this patent is extended or adjusted under 35 U.S.C. 154(b) by 0 days.

(21) Appl. No.: 10/282,253

(22) Filed: Oct. 28, 2002

(65) Prior Publication Data

US 2003/0121343 A1 Jul. 3, 2003

Related U.S. Application Data

(63) Continuation of application No. PCT/DE01/01543, filed on Apr. 23, 2001.

(30) Foreign Application Priority Data

Apr. 28, 2000 (DE) .......................................... 100 20 821

(51) Int. Cl.[7] .......................... F16H 59/00; F16H 3/08; F16H 3/38
(52) U.S. Cl. ............................. 74/335; 74/329; 74/340
(58) Field of Search .................................. 74/331, 340

(56) References Cited

U.S. PATENT DOCUMENTS

| | | | |
|---|---|---|---|
| 4,517,646 A | * | 5/1985 | Magnusson et al. .......... 74/866 |
| 5,172,602 A | | 12/1992 | Jürgens et al. |
| 5,408,898 A | * | 4/1995 | Steeby et al. ............. 74/473 R |
| 5,471,893 A | * | 12/1995 | Newbigging ................. 74/335 |
| 5,613,401 A | | 3/1997 | Maurizio |
| 6,014,603 A | * | 1/2000 | Le Van ..................... 477/78 X |
| 6,389,919 B1 | * | 5/2002 | Hennequet et al. ...... 74/473.37 |

FOREIGN PATENT DOCUMENTS

| | | | | |
|---|---|---|---|---|
| DE | 42 08 060 A | | 10/1992 | |
| DE | 41 17 734 A | | 2/1993 | |
| EP | 0 696 695 A | | 2/1996 | |
| JP | 407035236 | * | 2/1995 | ................ 74/473.1 |
| JP | 408114263 | * | 5/1996 | |

* cited by examiner

*Primary Examiner*—Roger Pang
(74) *Attorney, Agent, or Firm*—Henry M. Feiereisen (57) ABSTRACT

An aim of the invention is to provide a double clutch transmission enabling shift actuation in multiple gear trains with a single actuator device. The time required for a gear ratio change should also be reduced, hereby improving comfort and operability. To this end, the invention provides that a gear ratio can be shifted with an actuating element through a shifting element and that in the shifted state of this gear ratio, the same actuating element can actuate at least one other shifting element in order to select other gear ratios. A neutral channel wide enough to allow the selection movement of an actuation element is advantageously retained in the shifted state of one or more gear ratios. A shifting element may follow an actuating element with a path hysteresis that is identical to or greater than the path of the shifting element between the neutral position and a final gear position. This can be achieved by making the width of the shifting opening equal to or greater than the sum of the selector finger width and the distance between the neutral position and the final gear positions of the shift fork or by providing play equal to or greater than the path of the shifting element between the neutral position and the final gear position, between the shifting element and the actuating element.

21 Claims, 5 Drawing Sheets

ACTUATING ARRANGEMENT FOR A GEARBOX AND METHOD OF OPERATING THE SAME

This a continuation of International Application Serial No. PCT/DE01/01543, filed Apr. 23, 2001, the disclosure of which is hereby incorporated by reference.

BACKGROUND INFORMATION

There are actuating arrangements for gearboxes, in particular for double clutch transmission gearboxes having more than one gear path. Such actuating arrangements are used in particular in motor vehicles having a drive motor generating a driving torque which is transmissive along a torque flow from a drive shaft via the gearbox to an output shaft. The gear paths of the gearbox are arranged in parallel to each other and each gear path may comprise one, two or more gear ratios which can be individually shifted into the torque flow, i.e. can be engaged individually. The driving torque can be continually passed from one gear path to another gear path.

Such gearboxes or transmissions are, for example, known as so-called double clutch transmission gearboxes which usually have two parallel gear paths, each gear path being separable from the drive shaft by means of a clutch.

For changing the speeds, a driving ratio is engaged in each of the gear paths. If, for example, it is shifted from the first speed of the gearbox to the second speed of the gearbox, the first speed is engaged in the first gear path, and the second speed is engaged in the second gear path. Then, by actuating the clutches connecting the first and second gear paths to the drive shaft, the torque flow is shifted from the first gear path in which the first speed is engaged to the second gear path in which the second speed is engaged. To do this, the first clutch connecting the first gear path to the drive shaft is disengaged while the second clutch connecting the second gear path to the drive shaft is engaged. The engagement of the second clutch and the disengagement of the first clutch is coordinated such that an interruption of the torque flow is minimized or avoided. When the torque flow is fully shifted to the second gear path and the complete drive torque flows via the second gear path, the driving ratio engaged in the first gear path, which is now load free, may be shifted, for example, from the first speed to the third speed. Then, if it is desired to shift from the second gear to the third gear, the torque flow is continually redirected to the first gear path by disengaging the second clutch and engaging the first clutch at the same time. Thus, a continuous shifting operation can be performed between the two gear paths, where no torque flow interruption occurs.

As apparent from the above explanation, the two gear paths form two independent sub-transmissions, in each of which driving ratios may be engaged or changed independently from the respective other gear path. Due to this, in each gearbox of this type, each gear path has its own actuators, for example for shifting or selecting the speeds, and for allowing that each gear path may be actuated independently of the actuators assigned to the other gear path.

With known actuators, for example with actuators in which a selector finger is displaced for carrying out a selection operation such that the selector finger may engage different shift forks and in which a shifting operation is carried out by the selector finger actuating, for example via a shift fork, a shifting sleeve for engaging or disengaging a transmission ratio, a selection movement corresponding to a movement of the selector finger to another shift fork is no longer possible when a transmission ratio or speed is in engagement.

Hereby, it is in particular disadvantageous that two basically identical actuators for shifting the driving or gear ratios of such gearbox in the two gear paths have to be provided, negatively influencing the space required by such gearbox and the cost for manufacturing such gearbox.

OBJECTS OF THE INVENTION

An object of the instant invention is to provide a novel and improved gearbox which can be utilized with particular advantage in the power trains of motor vehicles.

Another object of the present invention is to provide an actuating arrangement for a gearbox which can be utilized with particular advantage in a gearbox with more than one gear path.

A further object of the present invention is to provide a relatively simple and inexpensive actuating arrangement for a gearbox having two or more gear paths, allowing a shifting operation in both gear paths.

Still another object of the present invention is to provide a novel and improved method of operating a gearbox which can be utilized with particular advantage with gearboxes in the power trains of motor vehicles.

Furthermore, it is an object of the present invention to reduce an amount of time necessary for performing a change of driving ratios in the gear path of a gearbox.

Furthermore, it is an object of the present invention to provide a gearbox, an actuating arrangement and/or a method for operating the same, providing improved comfort, operability and usability.

SUMMARY OF THE INVENTION

A feature of an exemplary embodiment of the present invention resides in the provision of an actuating arrangement comprising an actuating element with which a first driving ratio may be engaged via a first shifting element and which may actuate at least one second shifting element for engaging and/or disengaging at least one second driving ratio while the first driving ratio is in an engaged state.

Advantageously, according to another exemplary embodiment of the present invention, the actuating element may be shifted from an engagement with the first shifting element to an engagement with the at least one second shifting element, even when the first driving ratio is engaged.

According to an aspect of another exemplary embodiment of the present invention, a passageway or neutral channel is provided even then when one or more driving ratios are in the engaged state, the passageway being wide enough to allow a selection movement of the actuating element.

According to an aspect of another exemplary embodiment of the present invention, a shifting element follows the actuating element with a hysteresis (with a hysteresis of travel or path hysterisis). According to another advantageous aspect of this exemplary embodiment, the hysteresis is identical or greater than the distance between a neutral position of the shifting element where no driving ratio of the driving ratios actuated by this shifting element is engaged and a final gear position where one of the driving ratios actuated by this shifting element is in the engaged state. According to yet another aspect of this exemplary embodiment of the present invention, this can be accomplished by providing a shift fork opening, which is equal to or larger than a sum of the width of the selector finger and the distance between the neutral position of the shift fork and the final gear position of the shift fork. According to yet another aspect of this exemplary embodiment of the present invention, this can also be accomplished by providing a clearance or free motion between the shifting element and the actuating element which is equal to or larger than the travel of the shifting element between the neutral position and the final gear position.

According to another exemplary embodiment of the present invention, where groups of up to two driving or transmission ratios are provided which are actuated by the same shifting element, the shifting elements being provided in a spatial sequence with respect to their points of engagement for the actuating element, a group may comprise only one single driving ratio and/or a group may comprise a driving ratio and the with respect to the transmission ratio following driving ratio of the same gear paths and/or a group may comprise a transmission ratio such as a speed for driving forward and a reverse gear for driving backwards, for example, by disposing the shifting elements such that the, with respect to the transmission ratio following driving ratio of the same gear paths, can be shifted with the next but one shifting element in the sequence or even with the next shifting element in the sequence. According to another aspect of this exemplary embodiment of the present invention, a first group may comprise solely the first speed, a second group may comprise the third speed and the fifth speed, a third group may comprise the second speed and the fourth speed, and a fourth group may comprise the sixth speed and the reverse speed. According to another aspect of this exemplary embodiment of the present invention, a first group may comprise solely the first speed, a second group may comprise the second speed and the fourth speed, a third group may comprise the third speed and the fifth speed and a fourth group may comprise the sixth speed and the reverse speed.

According to another exemplary embodiment of the present invention which may be particularly advantageous, an actuating element is moved into a location after a shifting operation which allows a very fast shifting into the probably next driving ratio which has to be engaged. For example, it is useful and advantageous in an arrangement in which the first speed and the second speed form a group, to maintain the actuating element in engagement with the assigned shifting element when the first speed is in the engaged state.

According to another exemplary embodiment of the present invention, in a gearbox being operable in an automatic mode, where driving ratios of the gearbox are selected by means of a control unit and a manual mode where a selection of the driving ratios of the gearbox is initialized by a gear selector, the actuating element is brought into a position after a shifting operation in the manual mode from which the next higher driving ratio and the next lower driving ratio can be reached in a minimized amount of time. According to an aspect of this exemplary embodiment of the present invention, the actuating element is brought into a position after the shifting operation which is between the shifting element of the next higher driving ration and the shifting element of the next lower driving ratio with respect to the travel of the actuating element.

According to yet another exemplary embodiment of the present invention, the actuating element is brought into a position after a shifting occurred from which the next driving ratio of the same gear path (the next driving ratio with respect to the transmission ratio) can be reached in very short time. According to an aspect of this exemplary embodiment of the present invention, this may be accomplished by keeping the actuating element in engagement with the shifting element of the current driving ratio after the shifting operation.

According to yet another exemplary embodiment of the present invention, it might be in particular advantageous when the gearbox is operated in an automatic mode that the actuating element is displaced to a position after a shifting operation when a high load acceleration situation occurs, from which the next higher driving ratio can be reached within very short time. According to an aspect of this exemplary embodiment of the present invention, this may be accomplished in that the actuating element is brought into engagement with the shifting element of the next higher driving ratio after the shifting operation.

The novel features which are considered as characteristic of the invention, are set forth in particular in the appended claims. The novel and improved actuating arrangement, the gearbox and the method for operating the same, however, as to their construction and operation, together with numerous important advantageous features and attributes thereof, will be best understood upon perusal of the following detailed description of certain presently preferred specific embodiments with reference to the accompanying drawings.

BRIEF DESCRIPTION OF THE DRAWINGS

FIG. 1b is a sectional view of shifting elements and an actuating element in the shifting arrangement of FIG. 1a.

DESCRIPTION OF PREFERRED EMBODIMENTS

Figure 1A:
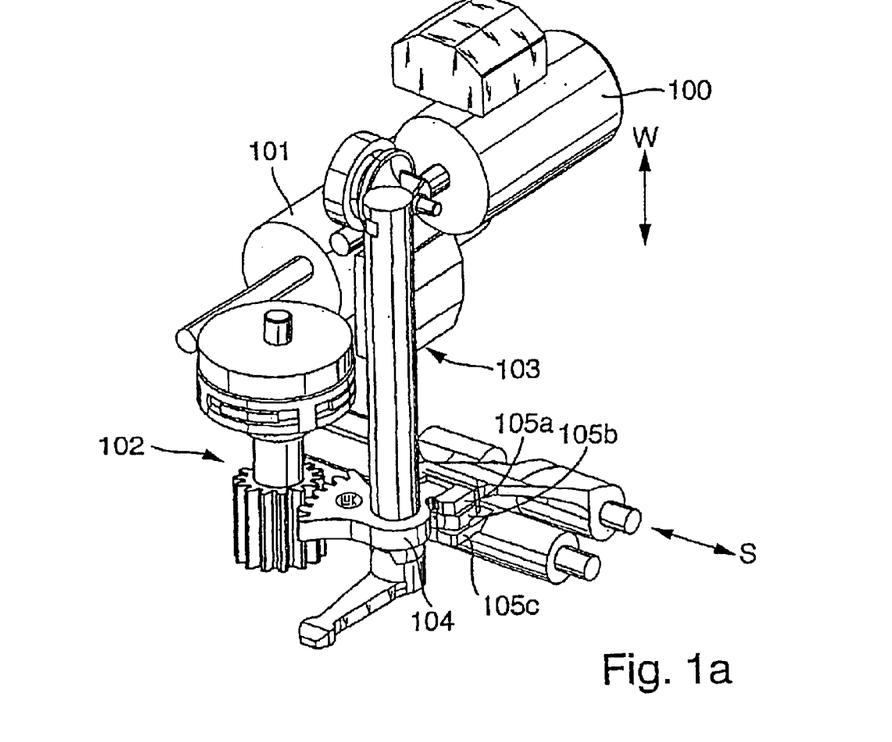
FIG. 1a is a simplified three-dimensional representation of the construction of a shifting arrangement according to an exemplary embodiment of the present invention.

FIG. 1a is a three-dimensional representation showing a construction of an actuating arrangement according to an exemplary embodiment of the present invention. In FIG. 1a, a selector drive 100 generates a selection movement and a shifting drive 101 generates a shifting movement. The selector drive 100 is connected to an actuating element 104 by a kinematic chain or linkage 103. The shifting movement is transmitted to the actuating element 104 by means of another kinematic chain or linkage 102. The selector drive 100 generates a movement of the actuating element 104 in a selection direction W, which is indicated in FIG. 1a with the arrow designated with the reference character W. The movement along the selection direction W brings a selector finger of the actuating element 104 into engagement with shift forks 105a, 105b or 105c. A movement of the shifting drive 101 converted by means of the kinematic chain 102 causes a movement of the actuating element 104 such that a shifting movement of the shift forks 105a, 105b or 105c is generated along a shifting direction S. The shifting direction S is indicated in FIG. 1a with an arrow designated with the reference character S. A movement of one of the shift forks 105a, 105b and 105c along the shifting direction S causes an engagement of the respective driving ratio of the gearbox via suitable shifting elements, such as shifting sleeves.

Figure 1B:
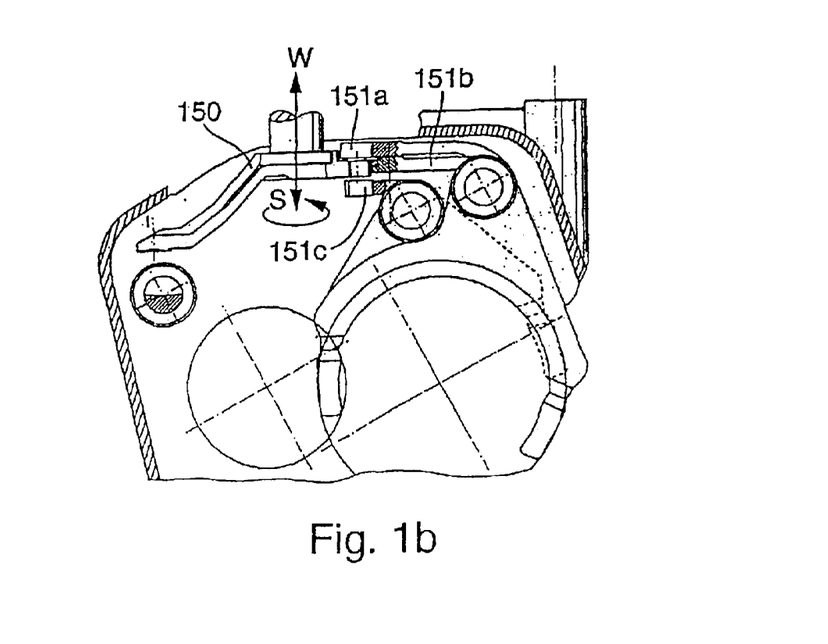

FIG. 1b is a sectional view of a detail in the actuating arrangement of FIG. 1a showing an actuating element with its selector finger and its shift forks. A selector finger of the actuating element 150 may be brought into engagement with the shift forks 151a, 151b, or 151c by a movement of the actuating element 150 along the selection direction W. In the situation depicted in FIG. 1b, the selector finger of the actuating element 150 is in engagement with the shift fork 151b, such that a shifting movement along the shifting direction S causes a displacement of the shifting fork 151b, whereby the respectively assigned driving ratios may be engaged or disengaged. The selection direction in FIG. 1b is indicated by arrow W and the shifting direction is indicated by arrow S. In the gearboxes, a driving ratio is changed, i.e. engaged or disengaged, by a displacement of the respective shift fork. To engage a driving ratio, the shift fork is moved from a neutral position into a final gear position. Thus, by moving the shift fork from the neutral position in both ways along the shifting direction S, two driving ratios may be engaged or disengaged: a first movement to a first side (e.g. the right side of FIG. 1a), brings the shift fork into a first final gear position for shifting a first driving ratio and a second movement from the neutral position to the second side (e.g. the left side of FIG. 1a), brings the shift fork into a second final gear position for shifting into the second driving ratio assigned to this shift fork. In the known arrangement, once the shift fork is in a shifted state, i.e., the first or second final gear position, the shift fork openings of shift forks arranged above each other are no longer positioned above each other such that the selector finger of the actuating element cannot be brought into engagement with another shift fork.

For changing the engagement of the selector finger of the actuating element to another shift fork, the shift forks have to be in the neutral position. In conventional gearboxes, the selector finger engages the shift fork opening with almost no clearance, to avoid a jamming of the selector finger in the shift fork opening during a displacement of the shift fork.

Figure 2:
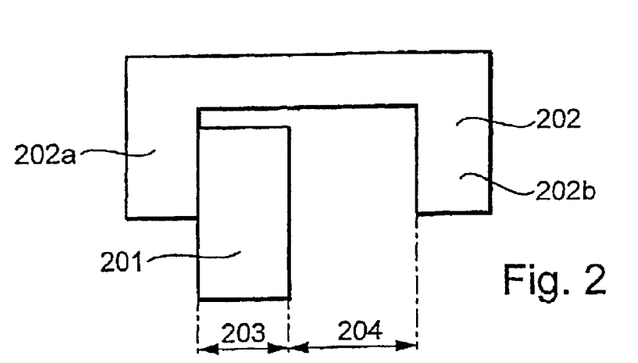
FIG. 2 is an enlarged view of a detail in the actuating arrangement of FIGS. 1a and 1b.

FIG. 2 shows a shift fork opening 202 of a shift fork and a selector finger 201 of an actuating element being in engagement with the shift fork opening according to an exemplary embodiment of the present invention. According to an aspect of this exemplary embodiment of the present invention, between the selector finger 201 and the shift fork opening 202, there is a significant clearance 204 allowing for a significant free motion of the selector finger 201 in the shift fork opening 202. According to another aspect of this exemplary embodiment of the present invention, it may be advantageous when the clearance is equal to or greater than a shift travel which the shift fork covers from the neutral position into the final gear position. Due to the clearance 204, the shift fork opening 202 and the shift fork follow the selector finger 201 of the actuating element with a hysteresis. This hysteresis is determined by the clearance 204. Accordingly, during a movement of the selector finger 201, the shift finger 201 firstly covers the distance of the clearance 204 before getting into contact with a side 202a or a side 202b of the shift fork opening 202.

Figure 3A:
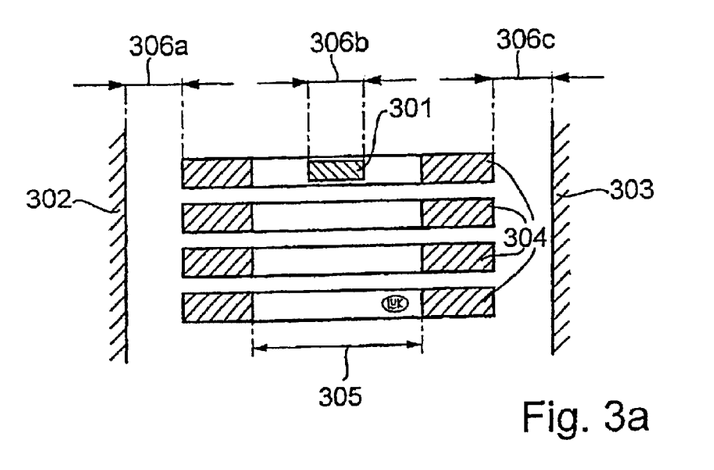
FIG. 3a is a schematic sectional view of shifting elements and an actuating element in a neutral position according to an exemplary embodiment of the present invention.

FIG. 3a shows an arrangement of four shift forks 304. In FIG. 3a, four shifting sleeves are provided as shift forks 304. The shift forks 304 have shift fork openings 305 which have a particularly wide width for the engagement with the selector finger 301. In the situation depicted in FIG. 3a, all four shift forks 304, i.e. all four shifting sleeves, are in their respective neutral position. The driving ratios are shiftable by a movement of the shifting sleeves 304 from the neutral positions into the final gear positions 302 and 303 along a distance which is indicated in FIG. 3a by arrows designated with the reference characters 306a and 306c. According to an aspect of this exemplary embodiment of the present invention, a width 305 of the shift fork openings is equal to or greater than a width 306b of the selector finger 301 and the shift travel 306a and 306c. According to another aspect of this exemplary embodiment of the present invention, the width 305 of the shift fork opening is equal to or greater than a sum of the width 306b of the selector finger 301 and the distance covered by the shift travel 306a and 306c from the neutral position to the respective final gear position.

Figure 3B:
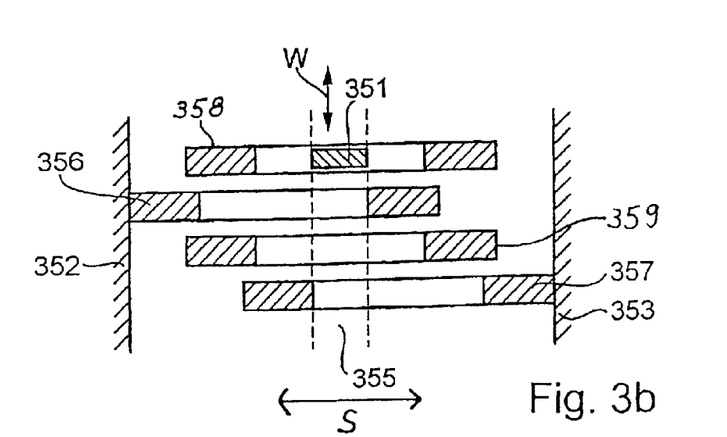
FIG. 3b is a schematic sectional view of shifting elements and an actuating element according to an exemplary embodiment of the present invention for explaining an interaction between the shifting elements and the actuating element according to an exemplary embodiment of the present invention.

FIG. 3b shows an arrangement similar to that of FIG. 3a where, in contrast to FIG. 3a, two shift forks or shifting sleeves 358 and 359 are in their neutral positions, whereas two shift forks or shifting sleeves 356 and 357 are in their final gear positions 352 and 353, according to an exemplary embodiment of the present invention. In comparison to FIG. 3a, where all shift forks 304 are in their neutral positions, the shift fork 356 was moved into its final gear position 353 by means of the selector finger 351 and the shift fork 357 was moved to the final gear position 353 by means of the selector finger 351. In the final gear positions 352 and 353, the driving ratios of the respective shift forks 356 and 357 assigned to the final gear positions 352 and 353 are in engagement. As can be seen, according to an aspect of an exemplary embodiment of the present invention, in spite of the fact that the shift forks 356 and 357 are in their respective final gear positions 352 and 353, there remains a passageway or neutral channel 355, allowing a movement of the selector finger 351 along the selection direction W for actuating another shift fork in this arrangement. For example, while the shift forks 356 and 357 are in the final gear positions 352 and 353, the selector finger 351 can be moved from its current position in the shift fork opening of the shift fork 358 to the shift fork opening of the shift fork 359 along the selection movement W indicated by the arrow in FIG. 3b designated with W. Then, being in the shift fork opening of the shift fork 359, the selector finger 351 may actuate the shift fork 359, i.e. the selector finger 351 may be moved along the selection direction S, as indicated with the arrow in FIG. 3b designated with S, and may shift the shift fork 351 to one of the final gear positions 352 and 353 for engaging the respectively assigned driving ratio. During all possible shifting states of the shift forks 356–359 in FIG. 3b, i.e. during all possible driving ratios engaged in the gear box, there remains the passageway 355, allowing that the selector finger 351 reaches all of the shift forks 356–359 for actuating the shift forks 356–359.

Figure 4:
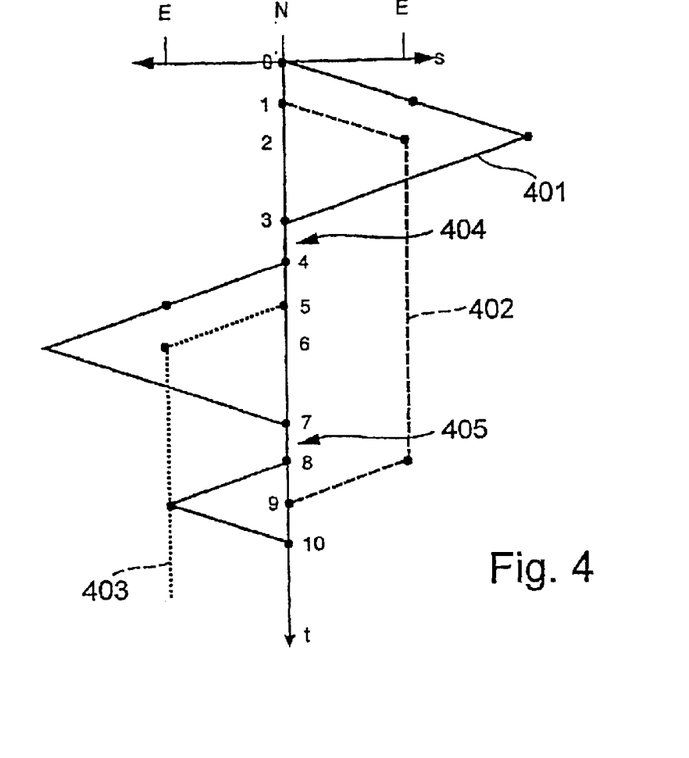
FIG. 4 is a timing chart showing shifting operations according to an exemplary embodiment of the present invention.

FIG. 4 shows a timing chart of a shifting sequence, which may be accomplished according to an exemplary embodiment of the present invention. In FIG. 4, the shift travel S is plotted against the time, wherein N designates the neutral position and E designates the two final gear positions of the shift forks. A movement of the selector finger is designated with reference character 401, a graph 402 shows a movement of a first shift fork and a graph 403 shows a movement of a second shift fork. At an instant 0, both shift forks and the selector finger are in the neutral position. Then, the shift fork is displaced towards a final gear position and covers hereby half to the clearance between the selector finger and the respective side of the shift fork opening of the first shift fork. At an instant 1, the selector finger has covered this clearance and contacts the side of the shift fork opening such that the first shift fork is actuated and displaced to the final gear position. For shifting into another gear or driving ratio, the selector finger is moved back into the neutral position, whereby the first shift fork remains in its final gear position, due to the clearance between the selector finger and the shift fork opening. Between instant 3 and 4, a selection operation is carried out by moving the selector finger from the shift fork opening of the first shift fork to the shift fork opening of the second shift fork. For shifting into the next speed, the selector finger now actuates the second shift fork, wherein, before actually displacing the second shift fork, the selector finger firstly covers half of the clearance to a side of the second shift fork. At instant 5, the selector finger contacts a side of the second shift fork, picks up the second shift fork and moves or displaces the second shift fork into a final gear position of the second shift fork, which is reached at instant 6. Due to the clearance between the selector finger and the shift fork opening, the selector finger can now move back into the neutral position, without moving the second shift fork out of its final gear position. In other words, the selector finger may move the second shift fork into its final gear position, may return to the neutral position and may then be displaced into the shift fork opening of another shift fork for actuating this other shift fork.

Between instants 7 and 8, another selection operation is carried out, by engaging the selector finger with the first shift fork which then disengages the respective driving ratio, by means of a shifting movement bringing the shift fork from the final gear position back into its neutral position. The neutral position is reached at instant 9. Then, the selector finger travels back into the neutral position N. At instant 10, the selector finger reaches the neutral position N and is now in the position for actuating other shift forks for performing further shifting operations.

Figure 5:
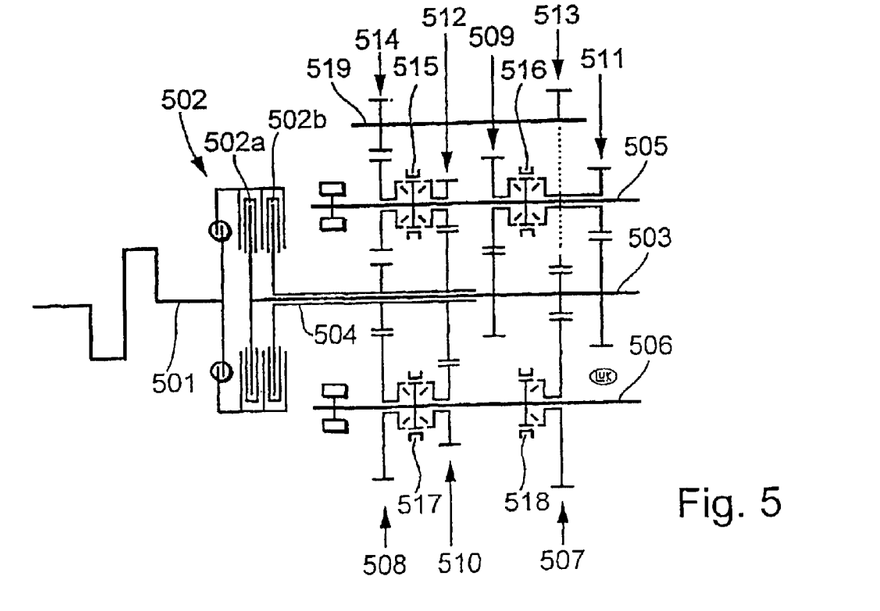
FIG. 5 is a schematic representation of a structure of a gearbox according to an exemplary embodiment of the present invention.

FIG. 5 shows a simplified and exemplary structure of a gearbox according to an exemplary embodiment of the present invention, in which an actuating arrangement according to the present invention operated according to a method according to an exemplary embodiment of the present invention, may be applied. With the gearbox input shafts 503 and 504 and the gearbox output shafts 505 and 506, two parallel gear paths are formed which are connectable to a drive shaft 501 by a clutch arranged 502. In the present embodiment, the gearbox input shaft 504 is a hollow shaft encompassing the gearbox input shaft 503. The clutch arrangement 502 comprises two clutch disks 502a and 502b forming two couplings. The clutch disk 502a is assigned to the gearbox input shaft 503 carrying toothed wheels of the first speed or driving ratio 507, of the third speed or driving ratio 509 and of the fifth speed or driving ratio 511. The clutch disk 502b is assigned to the gearbox input shaft 504 carrying a toothed wheel of the second speed or driving ratio 508, and a toothed wheel used by the fourth speed or transmission ratio 510 and the sixth speed or transmission ratio 512. Furthermore, the structure comprises a gearbox output shaft 519, including two reverse driving ratios 513 and 514, which are respectively assigned to the gearbox input shafts 503 and 504. In the present embodiment, idle gears of the driving ratios and the shifting sleeves, are disposed on the gear output shafts 505 and 506. According to another embodiment, one may also arrange idle gears on the gearbox input shaft 503 and/or 504.

In the gearbox structure depicted in FIG. 5, on the one hand groups of driving ratios are formed which may be shifted by means of one shifting sleeve 515, 516, 517 or 518 and thus by one shift fork, whereas on the other hand, these groups of driving ratios which, as the case may be, may also comprise only one driving ratio, are encompassed by the gear paths assigned to the clutch disks 502a and/or 502b. Due to this, advantageously, it is possible to shift between driving ratios succeeding each other with respect to their transmission ratio with minimized or reduced torque interruptions, by actuating the clutch disks 502a and 502b in alternation. For shifting into a driving ratio of the same gear path, it is necessary to interrupt the torque flux during the shifting operation by disengaging the respective clutch. Accordingly, in particular when a shifting operation between two driving ratios of the same gear path is performed, it may by important that the shifting operation is performed as fast as possible.

Figure 6A:
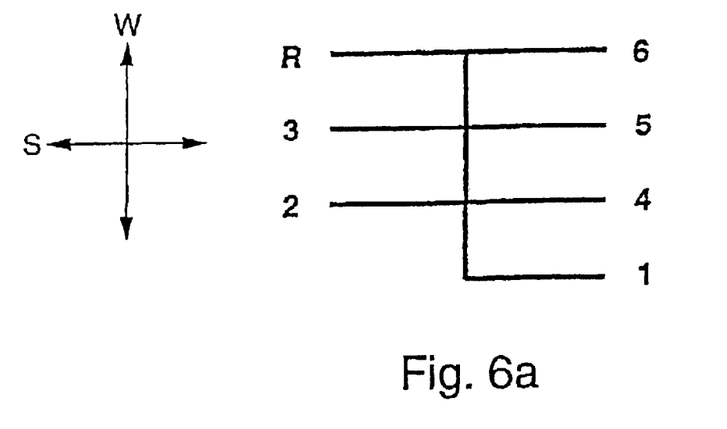
FIG. 6a is a gear shift pattern according to an exemplary embodiment of the present invention.
Figure 6B:
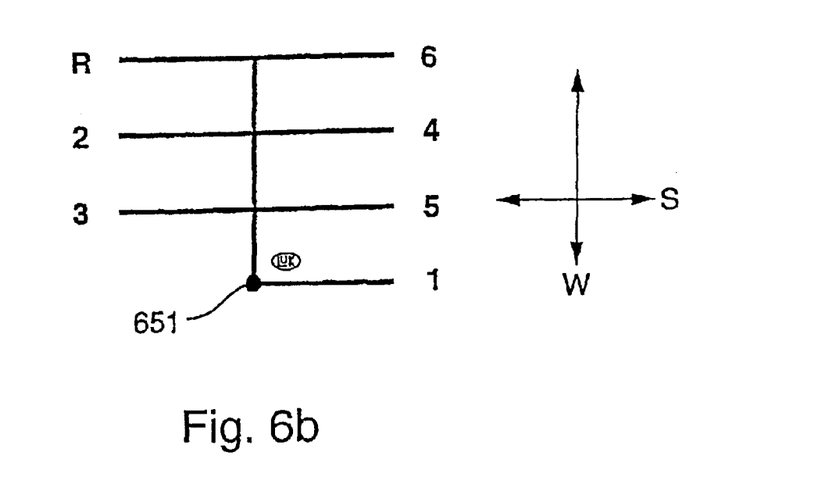
FIG. 6b is another gear shift pattern according to an exemplary embodiment of the present invention.

FIGS. 6a and 6b depict shifting patterns of the speeds or driving ratios according to an exemplary embodiment of the present invention which may be particularly advantageous in combination with the above-described embodiments. The arrow-cross on the left side of FIG. 6a and the arrow cross on the right side of FIG. 6b indicate the shifting and selecting movements in these shifting patterns, wherein the arrow designated with W indicates the direction of the selection movement and the arrow designated with S indicates the direction of the shifting movement. Both shifting patterns depicted in FIGS. 6a and 6b allow for a very fast shifting operation, as it may be required for shifting from one driving ratio to another driving ratio of the same gear path.

The shifting pattern depicted in FIG. 6a is arranged in a H-arrangement, having four shifting paths, wherein each shifting path corresponds to a group of driving ratios which are actuated by one shift fork. A first shifting path includes the first speed, a second shifting path includes the second and the fourth speed, a third shifting path includes the third and the fifth speed and a fourth shifting path includes the reverse gear and the sixth speed.

The shifting pattern depicted in FIG. 6b, which is a H-shifting pattern, comprises four shifting paths, wherein each shifting path corresponds to a group of driving ratios which are actuated by the same shift fork. The first shifting pattern includes the first speed, a second shifting path includes the third and the fifth speed, a third shifting path includes the second and the fourth speed and a fourth shifting path includes the reverse gear and the sixth speed.

In accordance with the above-described structure of a gearbox, the first, third and fifth speeds are assigned to a first clutch disk and the second, fourth and sixth speeds and the reverse gear are assigned to the second clutch disk. According to an aspect of this exemplary embodiment of the present invention, it may be advantageous that a shifting group which has only one driving ratio, namely in the embodiment depicted in FIGS. 6a and 6b and the first shifting path is arranged in a path which is on a side of the shifting pattern with respect to the selection direction W. Thus, for example, at point 651, a reference point for referencing the drive position is formed which is easy to access. Furthermore, it may be advantageous when the reverse gear is assigned to a shifting group which shift fork is disposed at the top of the shift forks, avoiding that the selector finger falls into the path of the reverse gear, in case a fracture occurs in the mechanic. Furthermore, it may be advantageous when adjacent speeds of the same gear paths are at least in a neighboring path. Shifting operations to the next higher or lower speed, with respect to the transmission ratio, are less critical with respect to the timing. However, in such shifting operations, the selection path should not be extended over more than two shifting paths, since the preceding speed should be disabled as fast as possible. All the above criteria are fulfilled with the arrangement in FIG. 6b.

In the arrangement shown in FIG. 6a, the above criteria are also fulfilled, except that during a shifting operation between the sixth and the fourth speed and the first and the third speed, a selection movement has to be carried out via two shifting paths.

Figure 7:
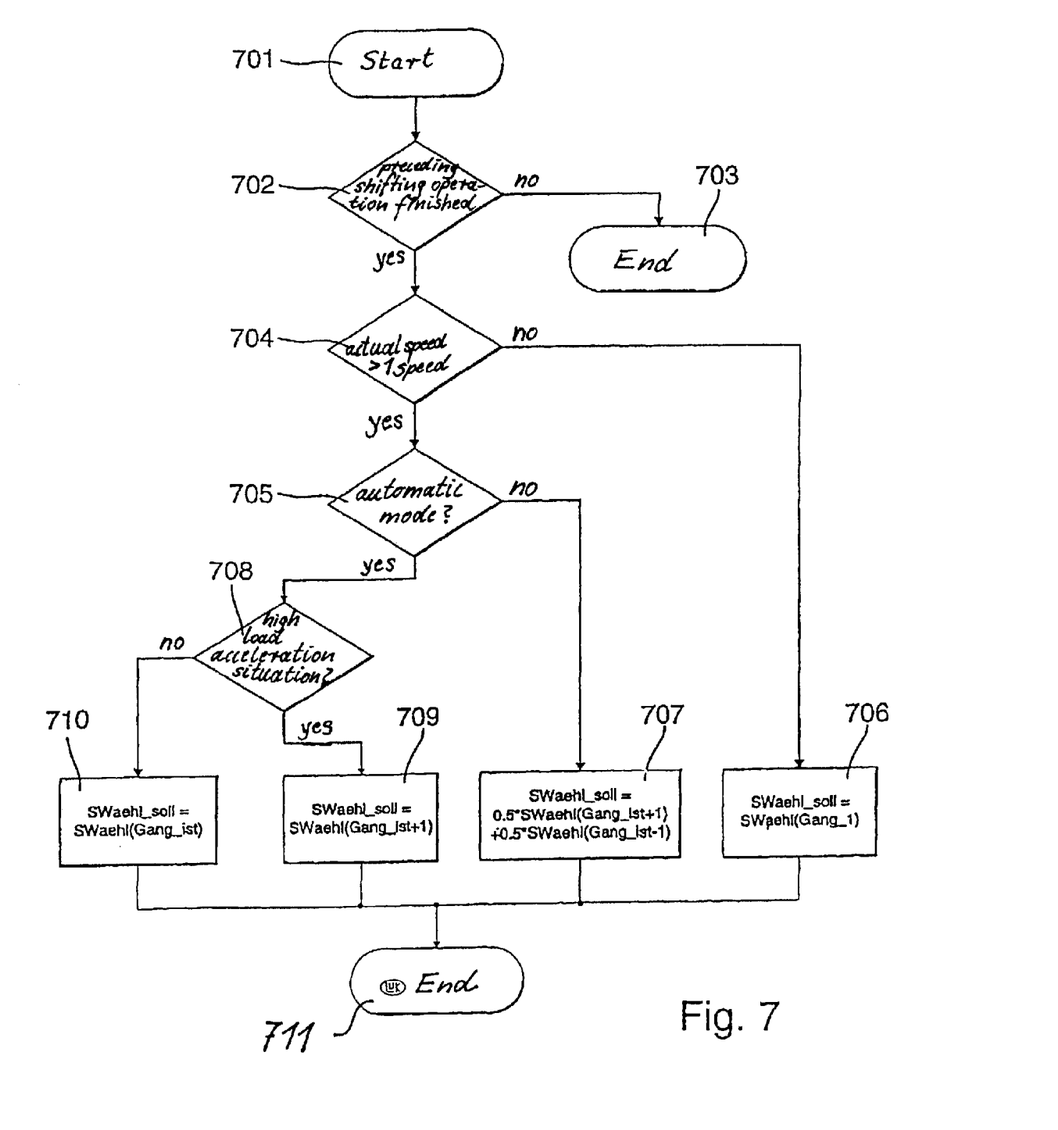
FIG. 7 shows a block diagram of a method of operating a gearbox according to an exemplary embodiment of the present invention.

FIG. 7 shows a diagram for determining a selection position. After the start in step 701, the method continues to step 702, where a determination is carried out with respect to whether the preceding shifting operation is finished or not. In case it is determined in step 702 that the preceding shifting operation is not yet finished, the method continues to step 703, where it ends.

In case it is determined in step 702 that the preceding shifting operation is finished, the method continues to step 704, where a determination is carried out whether the actually engaged speed is higher than the first speed. In case it is determined that the actual speed is not higher than the first speed, the method continues to step 706. In step 706, a set value of the selection position is set to the first speed. In step 706, this is indicated by "SWaehl–soll=SWaehl(Gang–1)", Since the situation in step 706 is a start-up operation, in which the second speed should be already engaged, the actuating element remains in the path of the first speed, in order to be able to disengage the first speed after a shift into the second gear within very short time and to then move to a new standby position. Then the method continues to step 711 where it ends.

When it is determined in step 704 that the actually engaged speed is higher than the first speed, the method continues to step 705, where a determination takes place, whether the gearbox operates in an automatic mode or in a manual mode. Hence, advantageously, different strategies for pre-selecting the shifting paths are selected depending from the mode of operation.

In case it is determined that the gearbox or vehicle is not operated in the automatic mode but operates in the manual mode, the method continues to step 707. In the manual mode, a shifting operation into the next higher or next lower speed is likely to appear. Thus, the selection actuator (e.g., the selector finger) should preferably be located between the shifting paths of these two speeds. In step 707, the set value for the best location is set to a location between the two speeds which is indicated by "SWaehl–soll=0.5*Waehl(Gang–ist+1), +0.5* Waehl(Gang–ist–1)". Here, the set value is set to the center of the distance between the next higher speed and the next lower speed. For example, in the arrangement depicted in FIG. 6b, a set value for the section position would be between the shifting paths of the third speed and the shifting path of the first speed when the second speed is engaged, since the shifting operation into the third speed or the first speed follows with a higher probability. Then the method continues to step 711, where it ends.

In case it is determined in step 705 that the gearbox or vehicle is operated in the automatic mode, the strategy for selecting the shifting path may be preferably made dependable from a high-load acceleration situation, such as a kick-down situation. Thus, in case it is determined in step 705 that the vehicle gearbox is operated in the automatic mode, the method continues to step 708 where a determination is carried out whether a high load acceleration situation exists or not. In case it is determined in step 708 that no high load acceleration situation is present, which usually will be the case, it is advantageous that the selection actuator remains in the shifting path of the actually engaged speed. Due to this, double down-shifting operations between driving ratios of the same gear paths during which an interruption of the torque flow occurs while successively the old speed is disengaged and the new speed is engaged, where the timing is very critical, can be carried out rapidly. In step 710, this is indicated by SWaehl–soll=SWaehl (Gang–ist). Then, the method continues to step 711 where it ends.

In case a high load acceleration situation is determined in step 708, the method continues to step 709. In a high load acceleration, a down-shifting is very unlikely. With the highest probability, a sequential shifting into the next higher speed follows. Accordingly, as indicated in step 709, the set value of the selection position is preferably set to the path of the next higher speed as the standby position. This is indicated with SWaehl–soll=SWaehl(Gang–ist+1) in step 709. Then the method continues to step 711 where it ends.

What is claimed is:

1. An actuating arrangement for a motor vehicle, the motor vehicle having a drive motor generating a driving torque, the driving torque being transmissive along a torque flow from a drive shaft via a gearbox to an output shaft, wherein the gearbox has a first gear path and a second gear path, the first and second gear paths being parallel to each other, wherein each of the first and second gear paths has one or more driving ratios which is individually shiftable into an engaged state, each of the first and second gear paths being connectable to the torque flow and separable from the torque flow and wherein the driving torque is continuously passable from the first gear path to the second gear path end vive versa, the actuating arrangement comprising:

an actuating element;

a first shifting element; and a second shifting element;

wherein a first driving ratio of the one or more driving ratios is shiftable to its engaged state by the actuating element via the first shifting element; and wherein a second driving ratio of the one or more driving ratios is shiftable to the engaged state by the actuating element via the second shifting element;

wherein the actuating element is switched from an engagement with the first shifting element to an engagement with the second shifting element while the first driving ratio is in the engaged state.

2. The actuating arrangement of claim 1, wherein the first driving ratio is part of the first gear path and the second driving ratio is part of the second gear path.

3. The actuating arrangement of claim 1, wherein, when one of the first and second driving ratios is in the engaged state, there is a passageway having a first width, the first width allowing a selection movement of the actuating element.

4. The actuating arrangement of claim 1, wherein a first travel along a first distance between a neutral position and a final gear position of one of the first and second shifting elements follows a second travel of the actuating element with a hysteresis, the hysteresis being equal to or larger than the first distance.

5. The actuating arrangement of claim 4,
wherein the actuating element comprises a selector finger, the selector finger having a second width;
wherein each of the first and second shifting elements has a functional region;
wherein the functional region is adapted for the engagement with the actuating element;
wherein the functional region includes an opening having a third width;
wherein the third width is equal to or larger than a sum of the second width and the first distance.

6. The actuating arrangement of claim 4, wherein a clearance is provided between the actuating element and one of the first and second shifting elements, the clearance being equal to or larger than the first distance.

7. An actuating arrangement for a gearbox having a first and a second gear path, the gearbox having at least a first driving ratio, a second driving ratio, a third driving ratio, a fourth driving ratio and a fifth driving ratio, wherein the fifth driving ratio is a reverse speed of the gearbox, the gearbox having a plurality of groups, each group having up to two driving ratios from the first, second, third, fourth and fifth driving ratios, the actuating arrangement comprising:
an actuating element;
a plurality of shifting elements;
wherein each shifting element of the plurality of shifting elements is assigned to each group of the plurality of groups such that the up to two driving ratios of each group of the plurality of groups is shiftable with the same shifting element;
wherein each shifting element of the plurality of shifting elements has a point of application for the actuating element;
wherein the plurality of shifting elements are spatially disposed in a sequence with respect to the points of application; and
at least one first group of the plurality of groups which is selected from the group consisting of a second group, a third group and a fourth group;
wherein the second group includes the first driving ratio;
wherein the third group includes the second driving ratio and the third driving ratio, each of the second and third driving ratios having a transmission ratio, wherein, with respect to the transmission ratios of the second and third driving ratios, the third driving ratio follows the second driving ratio within one of the first and second gear paths;
wherein the fourth group includes the fourth driving ratio and the fifth driving ratio; and
wherein the actuating element is switchable from an engagement with one of the shifting elements to an engagement with another one of the shifting elements while the first driving ratio is in the engaged state.

8. The actuating arrangement of claim 7,
wherein the plurality of shifting elements are disposed in the sequence, the sequence including a first shifting element, a second shifting element and a third shifting element of the plurality of shifting elements;
wherein the first, second and third shifting elements are spatially disposed in the sequence such that the second shifting element follows the first shifting element and the third shifting element follows the second shifting element;
wherein the first shifting element is arranged for shifting the second driving ratio and the third shifting element is arranged for shifting into the third driving ratio, the second driving ratio and the third driving ratio being in the same gear path of the first and second gear paths such that the first, second and third shifting elements are arranged in the sequence allowing a shift from the second driving ratio to the third driving ratio with the next but one shifting element in the sequence.

9. The actuating arrangement of claim 8,
wherein the gearbox is for a motor vehicle, the gearbox having the reverse speed, a first speed, a second speed, a third speed, a fourth speed, a fifth speed and a sixth speed;
wherein the plurality of groups further comprises a fifth group, the fifth group including the second speed of the gearbox and the fourth speed of the gearbox;
wherein the second group includes only the first driving ratio;
wherein the first driving ratio is the first speed;
wherein the second driving ratio is the third speed;
wherein the third driving ratio is the fifth speed; and
wherein the fourth driving ratio is the sixth speed.

10. The actuating arrangement of claim 7,
wherein the plurality of shifting elements are disposed in the sequence, the sequence including a first shifting element and a second shifting element of the plurality of shifting elements;
wherein the first and second shifting elements are spatially disposed in the sequence such that the second shifting element follows the first shifting element;
wherein the first shifting element is arranged for shifting into the second driving ratio and the second shifting element is arranged for shifting into the third driving ratio, the second driving ratio and the third driving ratio being in the same gear path of the first and second gear paths such that the first and second shifting elements are arranged in the sequence allowing a shift from the second driving ratio to the third driving ratio with the next shifting element in the sequence.

11. The actuating arrangement of claim 10,
wherein the gearbox is for a motor vehicle, the gearbox having the reverse speed, a first speed, a second speed, a third speed, a fourth speed, a fifth speed and a sixth speed;
wherein the plurality of groups further comprises a sixth group, the sixth group including the third speed of the gearbox and the fifth speed of the gearbox;
wherein the second group includes only the first driving ratio;
wherein the first driving ratio is the first speed;
wherein the second driving ratio is the second speed;
wherein the third driving ratio is the fourth speed; and
wherein the fourth driving ratio is the sixth speed.

12. A method of operating a gearbox for a motor vehicle, the motor vehicle having a drive motor generating a driving torque, the driving torque being transmissive along a torque flow from a drive shaft via a gearbox to an output shaft, wherein the gearbox has a first gear path and a second gear path, the first and second gear paths being parallel to each other, wherein each of the first and second gear paths has one or more driving ratios which is individually shiftable into an engaged state, each of the first and second gear paths being connectable to the torque flow and separable from the torque flow and wherein the driving torque is continuously passable from the first gear path to the second gear path and vice versa, the gearbox having an actuating arrangement, the actuating arrangement having an actuating element, a first shifting element and a second shifting element, the method comprising the steps of:

shifting a first driving ratio of the one or more driving ratios into its engaged state by the actuating element via the first shifting element; and shifting a second driving ratio of the one or more driving ratios into the engaged state by the actuating element via the second shifting element while the first driving ratio remains in the engaged state.

13. A method of actuating a gearbox, the gearbox having a first driving ratio and a second driving ratio, wherein the first and second ratios may be engaged and disengaged by means of a shifting element assigned to the first and second driving ratios, wherein the shifting element is actuated by an actuating element and wherein the second driving ratio is shifted to an engaged state by means of the actuating element while the first driving ratio is in the engaged state, the method comprising the steps of:

engaging the first driving ratio by bringing the shifting element in engagement with the actuating element; and maintaining the engagement of the shifting element and the actuating element when the first driving ratio is engaged.

14. A method of operating a gearbox, the gearbox being operable in an automatic mode and in a manual mode, wherein driving ratios of the gearbox are selected by means of a control unit in the automatic mode and wherein a selection of the driving ratios of the gearbox is initialized by means of a gear selector in the manual mode, the gearbox including an actuating element for engaging and disengaging transmission ratios of the gearbox, the method comprising the step of:

displacing the actuating element to a location in the manual mode after a transmission ratio of the gearbox has been changed to a first transmission ratio;

setting the location of the actuating element such that a first position for shifting into a second transmission ratio succeeding the first transmission ratio and a second position for shifting into a third transmission ratio preceding the first transmission ratio are reachable by the actuating element from the location within a minimized period of time; and allowing a switching of the actuating element from an engagement with one of the switching elements to an engagement with another one of the switching elements while a first driving ratio of the driving ratios is in the engaged state.

15. The method according to claim 14, wherein the location is between the first position and the second position.

16. A method of operating a gearbox having at least one gear path, the gearbox being operable in an automatic mode and in a manual mode, wherein driving ratios of the gearbox are selected by means of a control unit in the automatic mode and wherein a selection of the driving ratios of the gearbox is initialized by means of a gear selector in the manual mode, the gearbox including an actuating element for engaging and disengaging transmission ratios of the gearbox, method comprising the step of:

displacing the actuating element to a location in the automatic mode after a transmission ratio of the gearbox has been shifted to a first transmission ratio;

setting of the location of the actuating element such that a second transmission ratio of the gear box next to the first transmission ratio is engageable by the actuating element within a minimized period of time;

allowing a switching of the actuating element from an engagement with one of the switching elements to an engagement with another one of the switching elements while a first driving ratio of the driving ratios is in the engaged state.

17. The method according to claim 16, wherein the gearbox comprises a shifting element for engaging the first transmission ratio;

wherein the shifting element is actuated by the actuating element;

the method comprising the step of;

maintaining the actuating element and the shifting element in engagement after the first transmission ratio has been engaged.

18. A method of operating a gearbox having at least one gear path, the gearbox being operable in an automatic mode and in a manual mode, wherein driving ratios of the gearbox are selected by means of a control unit in the automatic mode and wherein a selection of the driving ratios of the gearbox is initialized by means of a gear selector in the manual mode, the gearbox including an actuating element for engaging and disengaging transmission ratios of the gearbox, method comprising the step of:

displacing the actuating element to a location in the automatic mode after a transmission ratio of the gearbox has been shifted to a first transmission ratio when a strong acceleration occurs;

setting the location of the actuating element such that a second succeeding higher transmission ratio of the gear box is engageable by the actuating element within a minimized period of time;

allowing a switching of the actuating element from an engagement with one of the switching elements to an engagement with another one of the switching elements while a first driving ratio of the driving ratios is in the engaged state.

19. The method according to claim 18, wherein the gearbox has a shifting element for engaging the second succeeding higher transmission ratio;

wherein the shifting element is actuated by the actuating element;

the method comprising the step of:

bringing the actuating element and the shifting element in engagement after the first transmission ratio has been engaged.

20. Gearbox for a motor vehicle, the motor vehicle having a drive motor generating a driving torque, the driving torque being transmissive along a torque flow from a drive shaft via the gearbox to an output shaft, the gearbox comprising:

a first gear path and a second gear path, the first and second gear paths being parallel to each other, wherein each of the first and second gear paths has one or more driving ratios which is individually shiftable into an engaged state, each of the first and second gear paths being connectable to the torque flow and separable from the torque flow and wherein the driving torque is continuously passable from the first gear path to the second gear path and vive versa;

an actuating element;

a first shifting element; and a second shifting element;

wherein a first driving ratio of the one or more driving ratios is shiftable to its engaged state by the actuating element via the first shifting element; and wherein a second driving ratio of the one or more driving ratios is shiftable to the engaged state by the actuating element via the second shifting element while the first driving ratio is in the engaged state.

21. Gearbox, comprising:

a first gear path and a second gear path;

at least a first driving ratio, a second driving ratio, a third driving ratio, a fourth driving ratio and a fifth driving ratio, wherein the fifth driving ratio is a reverse speed;

a plurality of groups, each group having up to two driving ratios from the first, second, third, fourth and fifth driving ratios;

an actuating element;

a plurality of shifting elements;

wherein each shifting element of the plurality of shifting elements is assigned to each group of the plurality of groups such that the up to two driving ratios of each group of the plurality of groups is shiftable with the same shifting element;

wherein each shifting element of the plurality of shifting elements has a point of application for the actuating element;

wherein the plurality of shifting elements are spatially disposed in a sequence with respect to the points of application; and at least one first group of the plurality of groups which is selected from the group consisting of a second group, a third group and a fourth group;

wherein the second group includes the first driving ratio; wherein the third group includes the second driving ratio and the third driving ratio, each of the second and third driving ratios having a transmission ratio, wherein, with respect to the transmission ratios of the second and third driving ratios, the third driving ratio follows the second driving ratio within one of the first and second gear paths;

wherein the fourth group includes the fourth driving ratio and the fifth driving ratio; and wherein one driving ratio of the first to fifth driving ratios is shiftable to the engaged state by the actuating element while another driving ratio of the first to fifth driving ratios is in the engaged state.

* * * * *